United States Patent
Ryu et al.

(10) Patent No.: US 11,869,884 B2
(45) Date of Patent: Jan. 9, 2024

(54) SEMICONDUCTOR DEVICES, METHODS OF DESIGNING LAYOUTS OF SEMICONDUCTOR DEVICES AND METHODS OF FABRICATING SEMICONDUCTOR DEVICES

(71) Applicant: SAMSUNG ELECTRONICS CO., LTD., Suwon-si (KR)

(72) Inventors: Jong-Kyu Ryu, Seoul (KR); Min-Su Kim, Hwaseong-si (KR); Yong-Geol Kim, Hwaseong-si (KR); Dae-Seong Lee, Busan (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 95 days.

(21) Appl. No.: 17/559,152

(22) Filed: Dec. 22, 2021

(65) Prior Publication Data
US 2022/0115369 A1 Apr. 14, 2022

Related U.S. Application Data

(63) Continuation of application No. 16/105,165, filed on Aug. 20, 2018, now Pat. No. 11,239,227.

(30) Foreign Application Priority Data

Jan. 11, 2018 (KR) .................. 10-2018-0003631

(51) Int. Cl.
*H01L 27/00* (2006.01)
*H01L 27/02* (2006.01)
(Continued)

(52) U.S. Cl.
CPC ............ *H01L 27/0207* (2013.01); *G03F 1/36* (2013.01); *G06F 30/398* (2020.01);
(Continued)

(58) Field of Classification Search
CPC .......... H01L 27/0207; H01L 27/11807; H01L 23/552; H01L 2027/11874; H01L 2027/11881; H01L 2027/11892
See application file for complete search history.

(56) References Cited

U.S. PATENT DOCUMENTS 7,546,568 B2 6/2009 Dirks et al.
7,737,472 B2 6/2010 Kondo et al.
(Continued)

FOREIGN PATENT DOCUMENTS

KR 10-2011-0024783 A 3/2011
KR 1020140107083 A 9/2014

OTHER PUBLICATIONS

Communication dated Oct. 31, 2021 issued by the Korean Patent Office in application No. 10-2018-0003631.

*Primary Examiner* — Caleb E Henry
*Assistant Examiner* — Alexander Belousov
(74) *Attorney, Agent, or Firm* — Sughrue Mion, PLLC

(57) ABSTRACT

A semiconductor device is provided. The semiconductor device includes a first hard macro; a second hard macro spaced apart from the first hard macro in a first direction by a first distance; a head cell disposed in a standard cell area between the first hard macro and the second hard macro, the head cell being configured to perform power gating of a power supply voltage provided to one from among the first hard macro and the second hard macro; a plurality of first ending cells disposed in the standard cell area adjacent to the first hard macro; and a plurality of second ending cells disposed in the standard cell area adjacent to the second hard macro, the head cell not overlapping the plurality of first ending cells and the plurality of second ending cells.

20 Claims, 19 Drawing Sheets

(51) Int. Cl.
*H01L 23/552* (2006.01)
*G03F 1/36* (2012.01)
*H01L 27/118* (2006.01)
*G06F 30/398* (2020.01)

(52) U.S. Cl.
CPC ...... *H01L 23/552* (2013.01); *H01L 27/11807* (2013.01); *H01L 2027/11874* (2013.01); *H01L 2027/11881* (2013.01); *H01L 2027/11892* (2013.01)

(56) References Cited

U.S. PATENT DOCUMENTS

| | | | |
|---|---|---|---|
| 9,047,433 B2 | 6/2015 | Yang et al. | |
| 9,419,014 B2 | 6/2016 | Gurumurthy | |
| 9,811,626 B2 * | 11/2017 | Jeong | G06F 30/39 |
| 10,002,223 B2 * | 6/2018 | Jeong | G06F 30/39 |
| 2016/0085897 A1 | 3/2016 | Jeong | |
| 2016/0267210 A1 | 9/2016 | Kang et al. | |
| 2017/0131933 A1 | 5/2017 | Kim et al. | |
| 2017/0168554 A1 | 6/2017 | Park | |
| 2017/0185096 A1 | 6/2017 | Rueger et al. | |
| 2017/0243888 A1 | 8/2017 | Shimbo | |
| 2018/0011961 A1 * | 1/2018 | Jeong | G06F 30/392 |
| 2018/0293344 A1 | 10/2018 | Hosmani et al. | |

* cited by examiner

SEMICONDUCTOR DEVICES, METHODS OF DESIGNING LAYOUTS OF SEMICONDUCTOR DEVICES AND METHODS OF FABRICATING SEMICONDUCTOR DEVICES

CROSS-REFERENCE TO THE RELATED APPLICATION

This application is a Continuation Application of U.S. application Ser. No. 16/105,165, filed on Aug. 20, 2018 in the U.S. Patent and Trademark Office, which claims priority from Korean Patent Application No. 10-2018-0003631, filed on Jan. 11, 2018, in the Korean Intellectual Property Office (KIPO), the entire content of which is incorporated herein by reference.

BACKGROUND

1. Field

Methods and apparatuses consistent with example embodiments relate to semiconductors. More specifically, example embodiments may relate to semiconductor devices, methods of designing layouts of semiconductor devices and methods of fabricating semiconductor devices.

2. Related Art

Semiconductor devices have become highly integrated and circuits of semiconductor devices have become complicated. Thus, manually designing a layout of a semiconductor device has been increasingly difficult. Accordingly, a semi-custom method of designing a layout of a semiconductor device using a computer may be used. In the semi-custom method, standard cells for performing logic functions may be provided to a cell library of a design tool in advance and a layout may be designed using the same. For example, the standard cell may have a rectangular shape.

As complexity of the chips becomes higher, relatively large-sized standard cells have been demanded.

SUMMARY

According to an aspect of an example embodiment, there is provided a semiconductor device, including: a first hard macro; a second hard macro spaced apart from the first hard macro in a first direction by a first distance; a head cell disposed in a standard cell area between the first hard macro and the second hard macro, the head cell being configured to perform power gating of a power supply voltage provided to one from among the first hard macro and the second hard macro; a plurality of first ending cells disposed in the standard cell area adjacent to the first hard macro; and a plurality of second ending cells disposed in the standard cell area adjacent to the second hard macro, the head cell not overlapping the plurality of first ending cells and the plurality of second ending cells.

According to an aspect of another example embodiment, there is provided a method of designing a layout of a semiconductor device including: receiving information indicating a size of a target chip; allocating a first hard macro area, a second hard macro area and an input/output area; and arranging a head cell, a plurality of first ending cells and a plurality of second ending cells in a standard cell area between the first hard macro area and the second hard macro area such that the head cell is not overlapped with the plurality of first ending cells and the plurality of second ending cells, the head cell being configured to perform power gating of a power supply voltage provided to at least one of the first hard macro area and the second hard macro area, and the second hard macro area being spaced apart from the first hard macro area in a first direction by a first distance.

According to an aspect of yet another example embodiment, there is provided a method of fabricating a semiconductor device, the method of fabricating including: designing a layout of a target chip in a layout design system; performing an optical proximity correction (an OPC) on the layout in a simulation tool in the layout design system to determine a layout change; manufacturing photomasks based on the layout change; and manufacturing the semiconductor device using the photomasks, the designing the layout of the target chip including: receiving information indicating a size of the target chip through the layout design system; allocating a first hard macro area, a second hard macro area and an input/output area; and arranging a head cell, a plurality of first ending cells and a plurality of second ending cells in a standard cell area between the first hard macro area and the second hard macro area such that the head cell is not overlapped with the plurality of first ending cells and the plurality of second ending cells, the head cell being configured to perform power gating of a power supply voltage provided to at least one of the first hard macro area and the second hard macro area, and the second hard macro area being spaced apart from the first hard macro area in a first direction by a first distance.

BRIEF DESCRIPTION OF THE DRAWINGS

The above and other aspects, features, and advantages will be more clearly understood from the following detailed description in conjunction with the accompanying drawings in which.

DETAILED DESCRIPTION

Various example embodiments will be described more fully hereinafter with reference to the accompanying drawings.

Figure 1:
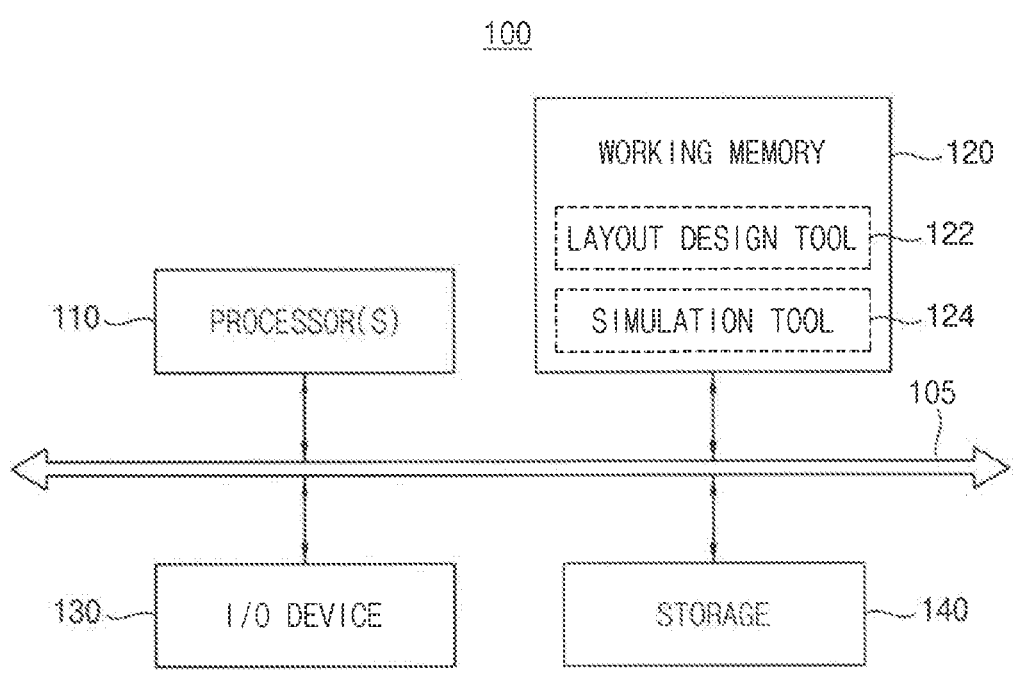
FIG. 1 is a block diagram illustrating a computing system for designing a semiconductor device, according to an example embodiment.

FIG. 1 is a block diagram illustrating a computing system for designing a semiconductor device, according to an example embodiment.

Referring to FIG. 1, a computing system 100 (i.e., a layout design system) may include at least one processor 110, a working memory 120, an input/output (I/O) device 130, and a storage device 140. The at least one processor 110, the working memory 120, the I/O device 130, and the storage device 140 may be connected to each other through a bus 105.

Here, the computing system 100 may be provided as a dedicated device for designing a layout according to an example embodiment. Moreover, the computing system 100 may be configured to drive various design and verification simulation programs.

The processor 110 may execute software (e.g., application program, operating system (OS), device drivers, etc.) to be executed in the computing system 100. The processor 110 may execute an OS loaded in the working memory 120. The processor 110 may execute various application programs to be driven based on an operating system. For example, the processor 110 may execute a layout design tool 122 loaded in the working memory 120.

An OS or application programs may be loaded in the working memory 120. When the computing system 100 is booted up, an OS image may be loaded onto the working memory 120 based on a booting sequence. An overall input/output operation of the computing system 100 may be supported by an OS. Likewise, application programs, which are selected by a user to provide a basic service, may be loaded in the working memory 120. Moreover, the layout design tool 122 for a layout design according to an example embodiment may also be loaded from the storage device 140 to the working memory 120.

The layout design tool 122 may include a biasing function for changing a form and a position of a specific layout pattern different from a form and a position defined by a design rule. Moreover, the layout design tool 122 may perform a design rule check (DRC) in the changed biasing data condition.

The working memory 120 may include a volatile memory such as a static random access memory (SRAM) or a dynamic random access memory (DRAM). However, the working memory 120 may include, but is not limited to, a nonvolatile memory such as a phase change random access memory (PRAM), a magnetoresistive random-access memory (MRAM), a resistance random access memory (ReRAM), a ferroelectric random access memory (FRAM), and a flash memory.

A simulation tool 124 for performing an optical proximity correction (OPC) about designed layout data may be further loaded in the working memory 120.

The I/O device 130 may include various devices and interfaces, which are capable of receiving information from a designer or providing information to a designer, such as a keyboard, a mouse and a monitor, as well as various interfaces for connecting the various devices. For example, a processing procedure and a processing result, or the like of the simulation tool 124 may be displayed through the I/O device 130.

The storage device 140 may be a storage medium of the computing system 100. The storage device 140 may store an application program, an OS image, and various kinds of data. For example, the storage device 140 may be a solid state drive (SSD), an embedded multimedia card (eMMC), or a hard disk drive (HDD). The storage device 140 may include a NAND Flash memory. Alternatively, the storage device 140 may include, but is not limited to, a nonvolatile memories such as a PRAM, a MRAM, a ReRAM, and a FRAM or a NOR flash memory.

Figure 2:
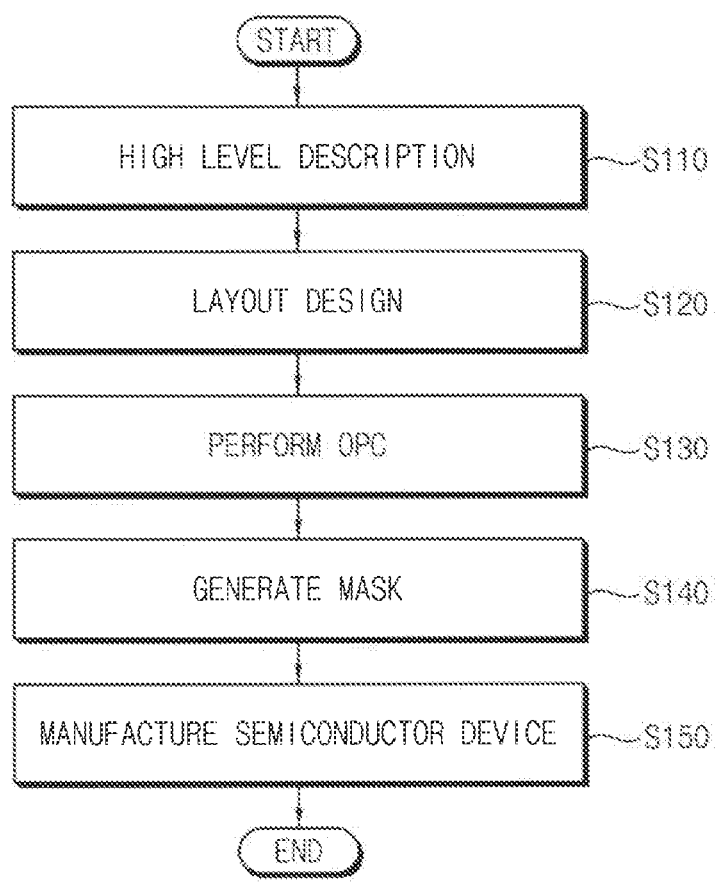
FIG. 2 is flowchart illustrating a method for designing and manufacturing a semiconductor device according to an example embodiment.

FIG. 2 is flowchart illustrating a method for designing and manufacturing a semiconductor device according to an example embodiment.

In operation S110, a high level design about a semiconductor integrated circuit may be performed using the computing system 100 illustrated in FIG. 1. The high level design may include describing an integrated circuit, which is a design target, with a high-level language of a hardware description language (HDL). For example, a high-level language such as C language may be used. Circuits designed using the high level design may be specifically expressed using a register transfer level (RTL) coding and may be verified using a RTL simulation. Furthermore, a code generated by the RTL coding may be changed into a netlist, and the netlist may be synthesized into a semiconductor device of a top level. The synthesized schematic circuit may be verified by the simulation tool 124, and an adjustment process may be performed based on a verification result.

In operation S120, a layout design for implementing a semiconductor integrated circuit, which is logically completed, on a silicon substrate may be performed. For example, the layout design may be performed based on a schematic circuit or a netlist corresponding thereto, which is synthesized in a high level design. The layout design may include a routing process for placing and connecting various standard cells provided from a cell library based on a prescribed design rule.

The standard cell may refer to a logic element (e.g., an inverter or a flip-flop) for performing a specific function. In other words, the standard cell may include a plurality of transistors and at least one interconnection connecting the transistors to each other, which are provided to constitute the logic element.

According to a method for designing a layout in an example embodiment, a head cell is arranged between a standard cell area between a first hard macro area and a second hard macro area, and first ending cells and second ending cells are arranged such that the head cell is not overlapped with the first ending cells and the second ending cells. Therefore, a layout area of a semiconductor device may be reduced.

A cell library for expressing a specific gate-level circuit as a layout may be defined in the layout design tool. The layout may be prepared to define or describe shapes and sizes of patterns constituting transistors and conductive lines which will be actually formed on a silicon substrate. For example, to actually form an inverter circuit on a silicon substrate, layout patterns (e.g., PMOS, NMOS, N-WELL, gate electrodes, and conductive lines) need to be properly placed.

For this, suitable inverters previously defined in the cell library may be searched and selected. In addition, a routing process may be performed on standard cells that have been selected and placed. These processes may be automatically or manually performed by the layout design tool.

After routing, a layout may be verified to determine whether there is a portion of the layout violating a design rule. As an example of a verification operation, a design rule check (DRC) may verify whether a layout is properly set to fit a design rule, an electrical rule check (ERC) may verify whether a layout is properly connected to each other without an electrical disconnection, and a layout vs schematic (LVS) may recognize whether a layout corresponds to a gate-level netlist.

In operation S130, an optical proximity correction (OPC) may be performed. Layout patterns obtained through a layout design may be implemented on a silicon substrate using a photolithography process. Here, the OPC may be a technology for correcting the layout to avoid a distortion phenomenon generated in a photolithography process. For example, the distortion phenomenon may be caused by refraction generated due to a characteristic of a light during an exposure or a process effect. To avoid these distortions, the layout may be corrected through the OPC. When the OPC is performed, a form and a position of designed layout patterns may be finely adjusted.

In operation S140, the photomasks may be manufactured based on a layout changed by the OPC. Generally, the photomask may be manufactured using a chrome thin film coated on a glass substrate with a method of depicting layer patterns.

In operation S150, a semiconductor device may be manufactured using the manufactured photomask. In a manufacture process of a semiconductor device using the photomask, various exposure and etching processes may be performed. Through such processes, patterns formed in a layout design may be sequentially formed on a silicon substrate.

Figure 3:
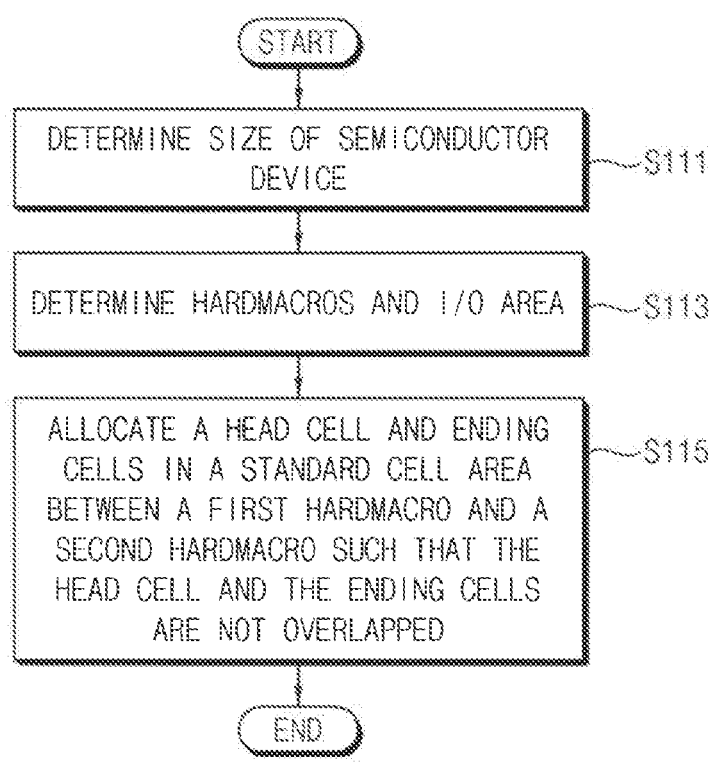
FIG. 3 is a flowchart illustrating a layout design method in FIG. 2, according to an example embodiment.
Figure 4:
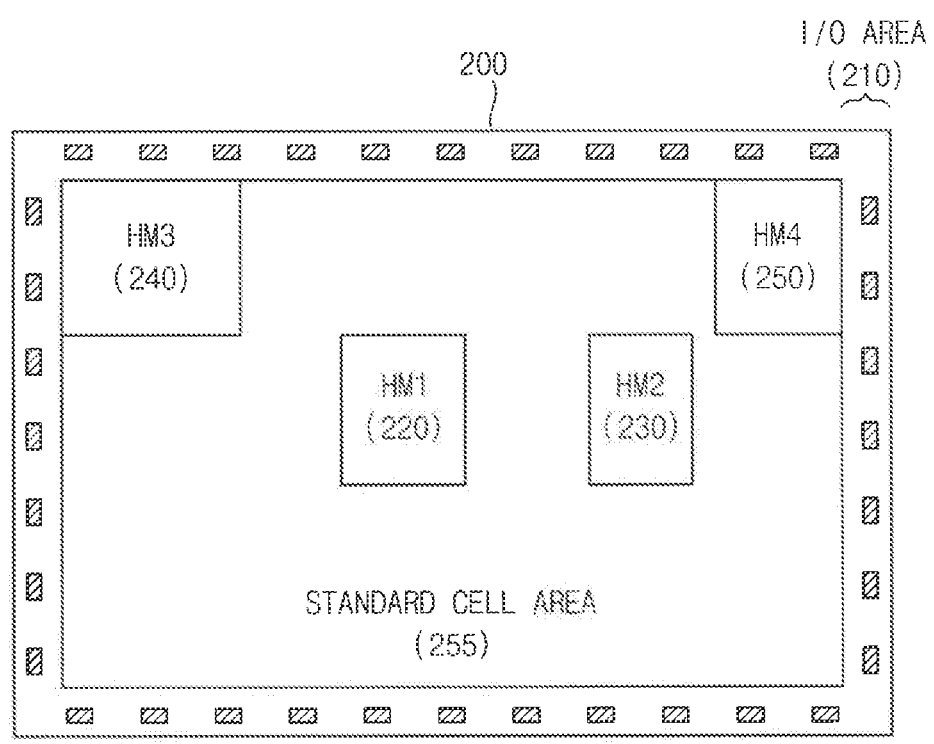
FIGS. 4 and 5 are chip plan views illustrating operations described in FIG. 3.
Figure 5:
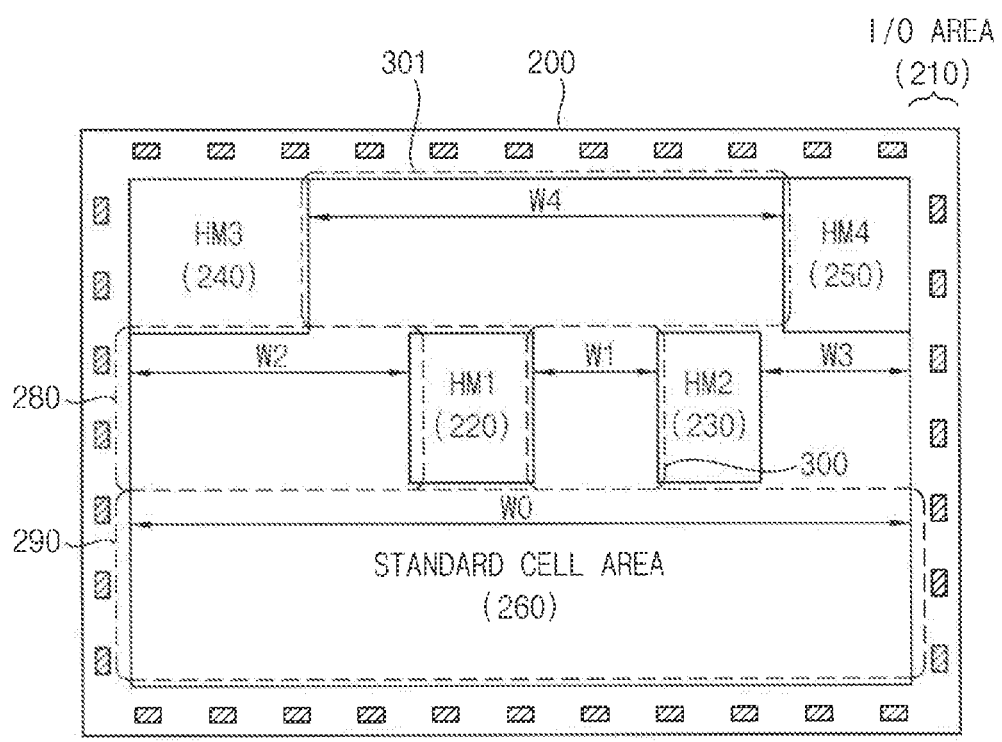

FIG. 3 is a flowchart illustrating a layout design method in FIG. 2, according to an example embodiment, and FIGS. 4 and 5 are chip plan views illustrating operations described in FIG. 3.

Referring to FIGS. 3, 4 and 5, chip specification information or verification information on a schematic circuit such as a gate-level netlist may be provided.

In operation S111, geometric information or a size information on a target chip, i.e., a semiconductor device 200 may be determined. The chip size may be determined based on the number of various standard cells to be formed in a chip for providing various functions determined at a schematic design level, a memory size, and a core block size.

In operation S113, an I/O area 210 in which an I/O circuit and a pad of the chip 200 will be formed may be determined. Moreover, a position of one or more hard macros (or, hard blocks) 220, 230, 240 and 250 be determined in a core area except for the I/O area 210. For example, the hard macros 220, 230, 240 and 250, in which an analog circuit block, a static random access memory (SRAM), and a CPU are formed, may be formed to be independent of a standard cell area 255.

In operation S115, a head cell, first ending cells and second ending cells are arranged in a standard cell area 300 between the first hard macro 220 and the second hard macro 230. The head cell may perform power gating of a power supply voltage supplied to at least one of the first hard macro 220 and the second hard macro 230, the first ending cells may protect first cells formed in the standard cell area 300 from the first hard macro 220 and the first ending cells may protect second cells formed in the standard cell area 300 from the second hard macro 230. The head cell may be arranged such that the head cell does not overlap the first ending cells or the second ending cells.

Referring to FIG. 4, the I/O area 210 and the hard macro areas 220, 230, 240 and 250 may be allocated when a size of the target chip is determined. Throughout the specification, a hard macro area refers to an area in which a hard macro is formed, and it is understood that the hard macro area has a same meaning as the hard macro.

For example, a size of the I/O area 210, in which I/O pads for exchanging data or signals with the outside of a chip, I/O buffers, and drivers are formed, may be determined to allocate the I/O area 210 and the hard macro areas 220, 230, 240 and 250. Moreover, the hard macro areas 220, 230, 240 and 250 in the chip 200 may be determined. Positions of the hard macro areas 220, 230, 240 and 250 may be determined based on a distance between an I/O pad and each of the hard macro areas 220, 230, 240 and 250, a configuration of a power rail, or a relative distance between other cores and each of the hard macro areas 220, 230, 240 and 250. The remainder may be allocated to a standard cell area 255 when the I/O area 210 and the hard macro areas 220, 230, 240 and 250 are determined.

FIG. 5 is a plan view slowing a width of a standard cell area.

Referring to FIG. 5, the standard cell area 255 may be classified based on three attributes. The standard cell area may be classified into a standard cell area 301 in which hard macro areas 240 and 250 are located on both sides thereof, a standard cell area 280 located between the I/O area 210 and the hard macro area 220, and a standard cell area 260 not overlapped with a hard macro in the I/O area 210.

A width W1 of a standard cell area 300, in which the hard macro areas 220 and 230 are located at both sides thereof, may correspond to an odd number multiple of a unit placement width w. A width W4 of the standard cell area 301 may also be set to an odd number multiple of the unit placement width w.

A width W2 of the standard cell area 280 located between the I/O area 210 and the hard macro area 220 may also be set to an odd number multiple of the unit placement width w. Likewise, a width W3 of a standard cell area may also be set to an odd number multiple of the unit placement width w.

This rule may be similarly applied to the standard cell area 290. A width W4 of the standard cell area 290 may be set to an odd number multiple of the unit placement width w.

Figure 6:
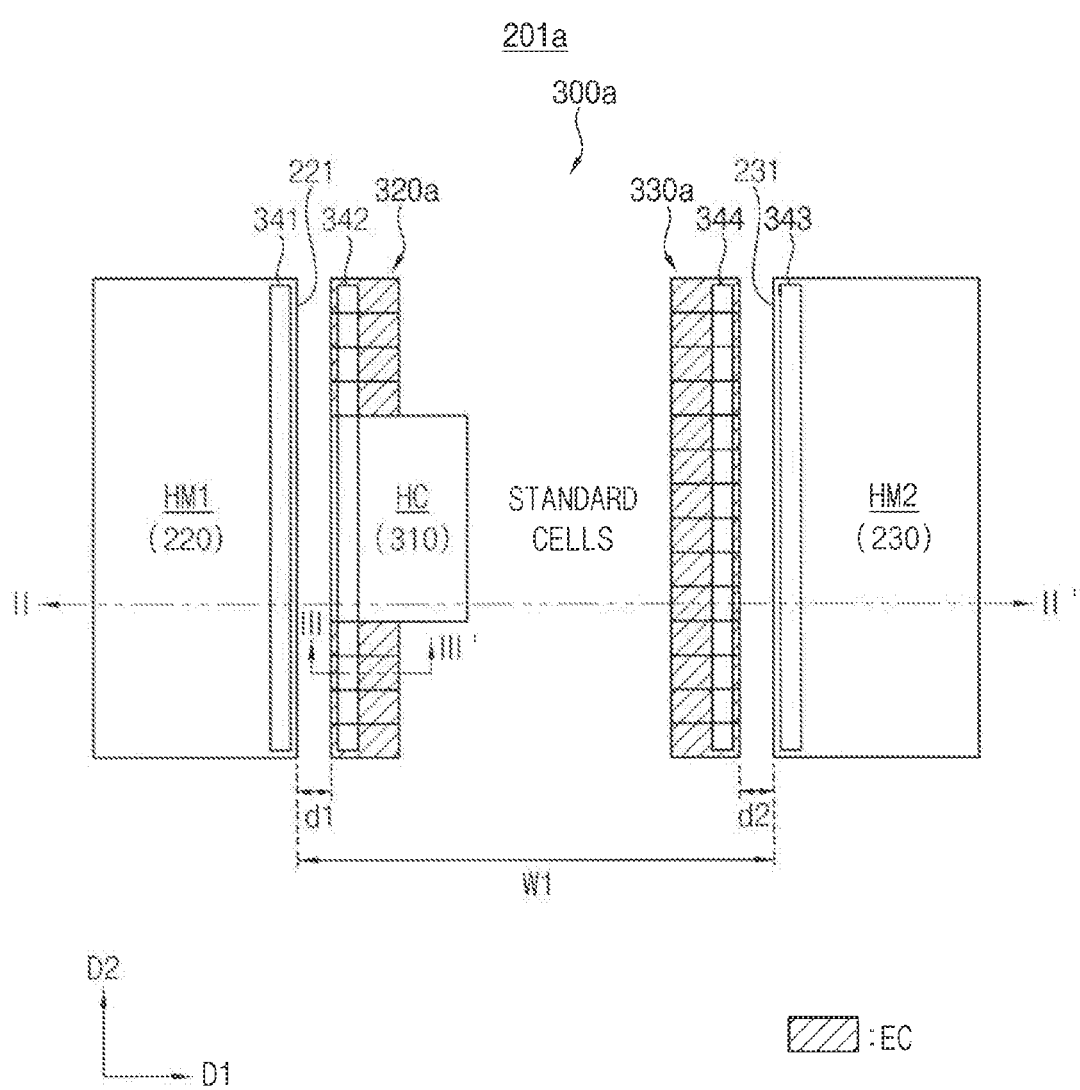
FIG. 6 illustrates an example of a portion of the semiconductor device of FIG. 4 according to an example embodiment.

FIG. 6 illustrates an example of a portion of the semiconductor device of FIG. 4 according to an example embodiment.

FIG. 6 illustrates a semiconductor device 201*a* that includes a standard cell area 300*a* disposed between the hard macros 220 and 230.

Referring to FIG. 6, the standard cell area 300*a* is defined between the first hard macro 220 and the second hard macro 230, and the second hard macro 230 is spaced apart from the first hard macro 220 by a first distance W1 in a first direction D1.

A plurality of first ending cells 320*a*, a plurality of second ending cells 330*a* and a head cell 310 are arranged in the standard cell area 300*a*. The head cell 310 may perform power gating of a power supply voltage supplied to the first hard macro 220.

The first ending cells 320*a* may be spaced apart from a first edge 221 of the first hard macro 220 by a first gap d1 in the first direction D1, may be arranged along the second direction D2 and may be adjacent to the first hard macro 220. The head cell 310 may be disposed among the first ending cells 320*a*. The first ending cells 320*a* may protect first cells in the standard cell area 300*a* from the first hard macro 220.

The second ending cells 330*a* may be spaced apart from a second edge 231 of the second hard macro 230 by a second gap d2 in the first direction D1, may be arranged along the second direction D2 and may be adjacent to the second hard macro 230. The second ending cells 330*a* may protect second cells in the standard cell area 300*a* from the second hard macro 230.

Because the head cell 310 replaces a portion of the first ending cells 320*a*, a first number of the first ending cells 320*a* may be smaller than a second number of the second ending cells 330*a*.

A first shielding pattern 341 may be disposed in the first hard macro 220 and a third shielding pattern 343 may be disposed in the second hard macro 230. The standard cell area 300*a* may further include a second shielding pattern 342 and a fourth shielding pattern 344. The first shielding pattern 341 may be disposed in the first hard macro 220 to extend in the second direction D2 adjacent to the first edge 221. The second shielding pattern 342 may be disposed to extend in the second direction D2 and to cross the first ending cells 320*a* and the head cell 310.

The third shielding pattern 343 may be disposed in the second hard macro 230 to extend in the second direction D2 adjacent to the second edge 231. The fourth shielding pattern 344 may be disposed to extend in the second direction D2 and to cross the second ending cells 330*a*.

The first to fourth shielding patterns 341, 342, 343 and 344 may be disposed to block various interferences generated in manufacturing process because various cells formed in the standard cell area 300*a* and cores formed in the first hard macro 220 and the second hard macro 230 have different configurations.

In an example embodiment, each of the first ending cells 320*a* may operate as one of an ending capacitor, a dummy cell and a well-tie, and each of the second ending cells 330*a* may operate as one of an ending capacitor, a dummy cell and a well-tie. When each of the first ending cells 320*a* and each of the second ending cells 330*a* operate as a dummy cell, each of the first ending cells 320*a* and each of the second ending cells 330*a* may further operate as a well-tie.

Figure 7A:
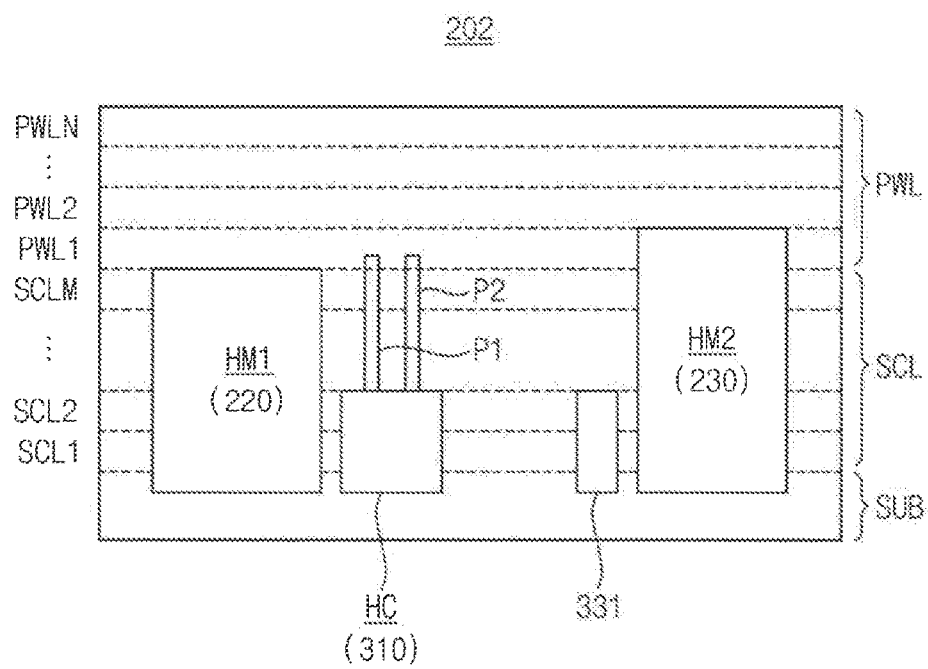
FIG. 7A is a cross-sectional view of an example of the semiconductor device taken along a line II-II' in FIG. 6.

FIG. 7A is a cross-sectional view of an example of the semiconductor device taken along a line II-IF in FIG. 6.

Referring to FIG. 7A, a semiconductor device 202 may include a substrate layer SUB, a signal connection layer SCL and a power mesh layer PWL. The signal connection layer SCL may include first through M-th signal connection layers SCL1~SCLM, where M is a natural number, and the power mesh layer PML may include first through N-th power mesh layers PWL1~PWLN. The first signal connection layer SCL1 may be located on the substrate SUB The first power mesh layer PWL1 may be located on the M-th signal connection layer SCLM.

Power supply voltage lines included in the first through N-th power mesh layers PWL1~PWLN may be connected to each other through first vias, and ground voltage lines included in the first through N-th power mesh layers PWL1~PWLN may be connected to each other through second vias.

The first hard macro 220 and the second hard macro 230 may be included in the substrate layer SUB, the signal connection layer SCL and the power mesh layer PWL, and may have a predetermined internal signal connection structure. In an example embodiment where the first hard macro 220 is a memory cell, the first hard macro 220 is included in the substrate layer SUB and the signal connection layer SCL. In an example embodiment where the second hard macro 230 is a phase-locked loop, the second hard macro 230 is included in the substrate layer SUB, the signal connection layer SCL and the power mesh layer PWL.

The head cell 310 may be included in the substrate layer SUB and the signal connection layer SCL, may be connected to a power supply voltage in the first power mesh layer PWL1 through a first via P1 and may be connected to a ground voltage in the first power mesh layer PWL1 through a second via P2. An ending cell 331, one of the second ending cells 330*a* may be included in the substrate layer SUB and the signal connection layer SCL.

Figure 7B:
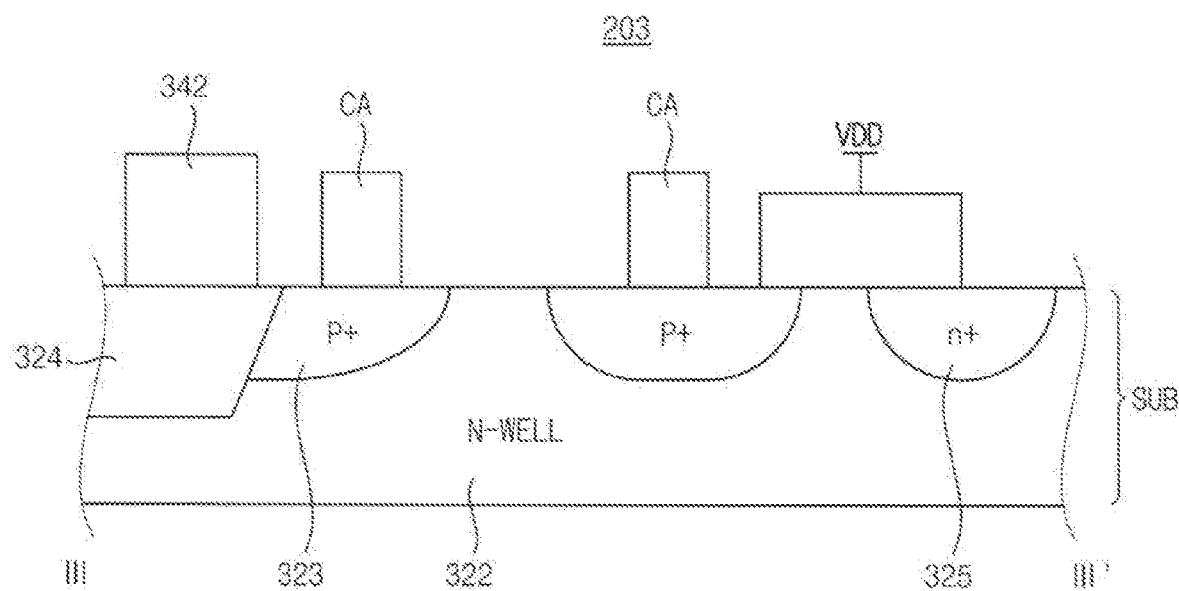
FIG. 7B is a cross-sectional view of an example of the semiconductor device taken along a line III-III' in FIG. 6.

FIG. 7B is a cross-sectional view of an example of the semiconductor device taken along a line III-III' in FIG. 6.

Referring to FIG. 7B, a semiconductor device 203 may include a substrate (layer) SUB, an active region 322 defined in the substrate SUB, a device isolation region 324 to limit the active region 322, a first impurity region 323 and a second impurity region 325 formed in the active region 322, a shielding pattern 342 formed on the device isolation region 324 and a source/drain contact CA formed on the first impurity region 323. A power supply voltage VDD may be connected to the first impurity region 323 and the second impurity region 325. Therefore, each of the first ending cells 320*a* and the each of the second ending cells 330*a* may operate as one of an ending capacitor, a dummy cell and a well-tie. In addition, each of the first ending cells 320*a* and the each of the second ending cells 330*a* may operate as one or more of an ending capacitor, a dummy cell and a well-tie.

Figure 8:
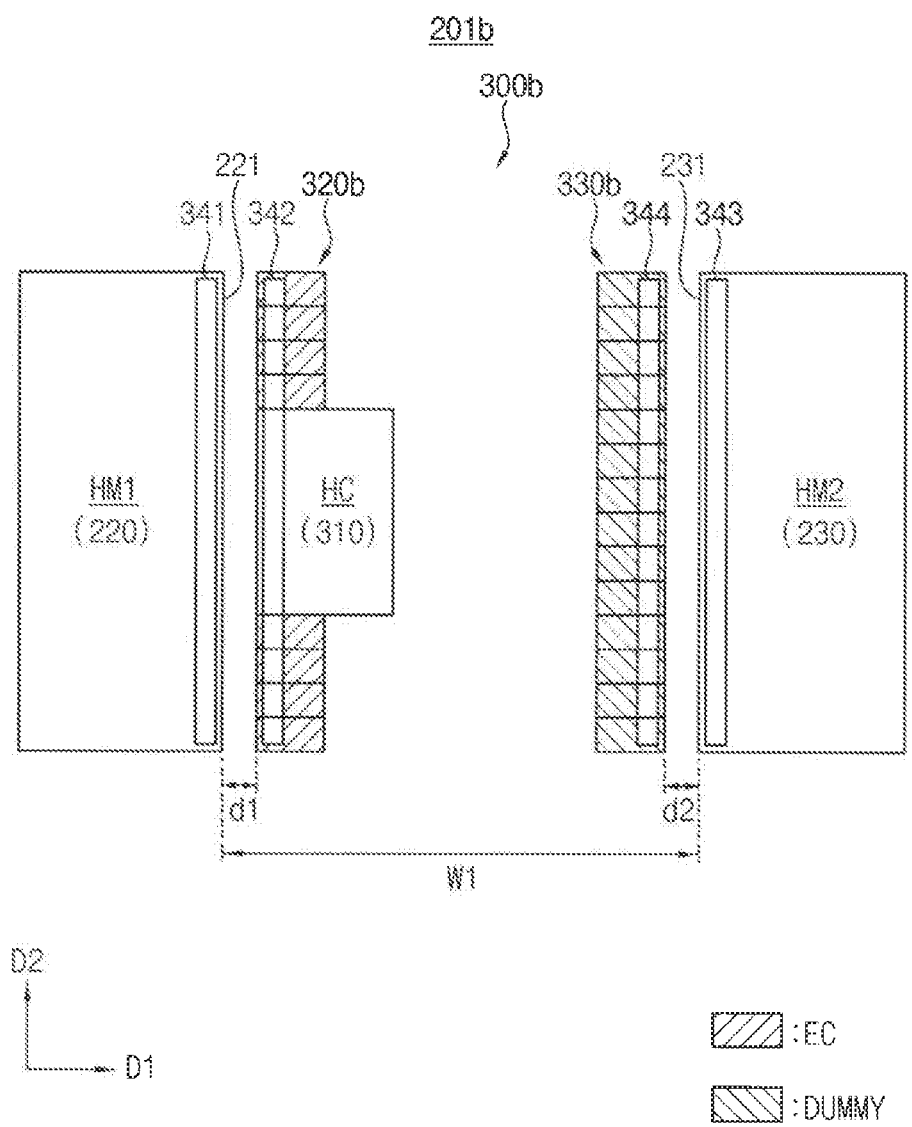
FIG. 8 illustrates another example of a portion of the semiconductor device of FIG. 4 according to an example embodiment.

FIG. 8 illustrates another example of a portion of the semiconductor device of FIG. 4 according to an example embodiment.

FIG. 8 illustrates a semiconductor device 201*b* that includes a standard cell area 300*b* disposed between the hard macros 220 and 230.

Referring to FIG. 8, the standard cell area 300*b* is defined between the first hard macro 220 and the second hard macro 230, and the second hard macro 230 is spaced apart from the first hard macro 220 by a first distance W1 in the first direction D1.

A plurality of first ending cells 320*b*, a plurality of second ending cells 330*b* and the head cell 310 are arranged in the standard cell area 300*b*. The first ending cells 320*b* may be spaced apart from the first hard macro 220 by a first gap d1 in the first direction D1, and may be arranged along the second direction D2. The second ending cells 330*b* may be spaced apart from the second hard macro 230 by a second gap d2 in the first direction D1, and may be arranged along the second direction D2. The head cell 310 may be disposed among the first ending cells 320b.

A first shielding pattern 341 may be disposed in the first hard macro 220 and a third shielding pattern 343 may be disposed in the second hard macro 230 and the standard cell area 300b may further include a second shielding pattern 342 and a fourth shielding pattern 344.

In an example embodiment, each of the second ending cells 330b may operate as a dummy cell, and each of the first ending cells 320b may operate as a well-tie or as the well-tie and one or more of an ending capacitor and a dummy cell.

Figure 9:
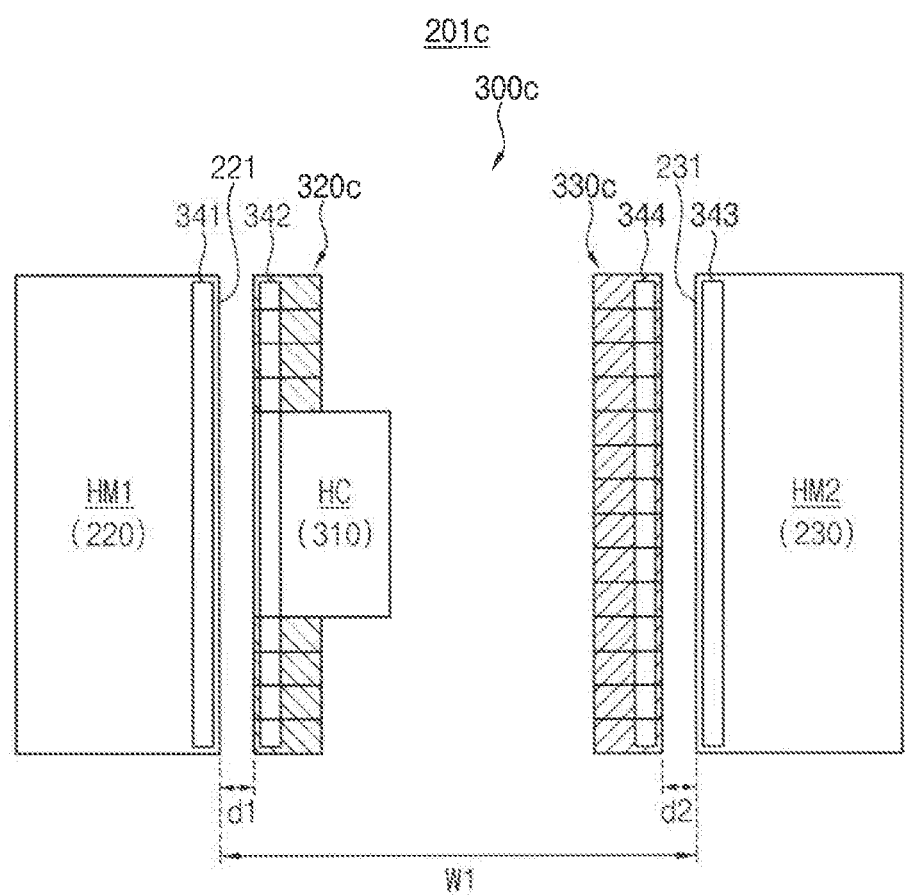
FIG. 9 illustrates another example of a portion of the semiconductor device of FIG. 4 according to an example embodiment.

FIG. 9 illustrates another example of a portion of the semiconductor device of FIG. 4 according to an example embodiment.

FIG. 9 illustrates a semiconductor device 201c that includes a standard cell area 300c disposed between the hard macros 220 and 230.

Referring to FIG. 9, the standard cell area 300c is defined between the first hard macro 220 and the second hard macro 230, and the second hard macro 230 is spaced apart from the first hard macro 220 by a first distance W1 in the first direction D1.

A plurality of first ending cells 320c, a plurality of second ending cells 330c and the head cell 310 are arranged in the standard cell area 300c. The first ending cells 320c may be spaced apart from the first hard macro 220 by a first gap d1 in the first direction D1, and may be arranged along the second direction D2. The second ending cells 330c may be spaced apart from the second hard macro 230 by a second gap d2 in the first direction D1, and may be arranged along the second direction D2. The head cell 310 may be disposed among the first ending cells 320c.

A first shielding pattern 341 may be disposed in the first hard macro 220 and a third shielding pattern 343 may be disposed in the second hard macro 230 and the standard cell area 300c may further include a second shielding pattern 342 and a fourth shielding pattern 344.

In an example embodiment, each of the first ending cells 320c may operate as a dummy cell, and each of the second ending cells 330c may operate as a well-tie or as the well-tie and one or more of an ending capacitor and a dummy cell.

Figure 10:
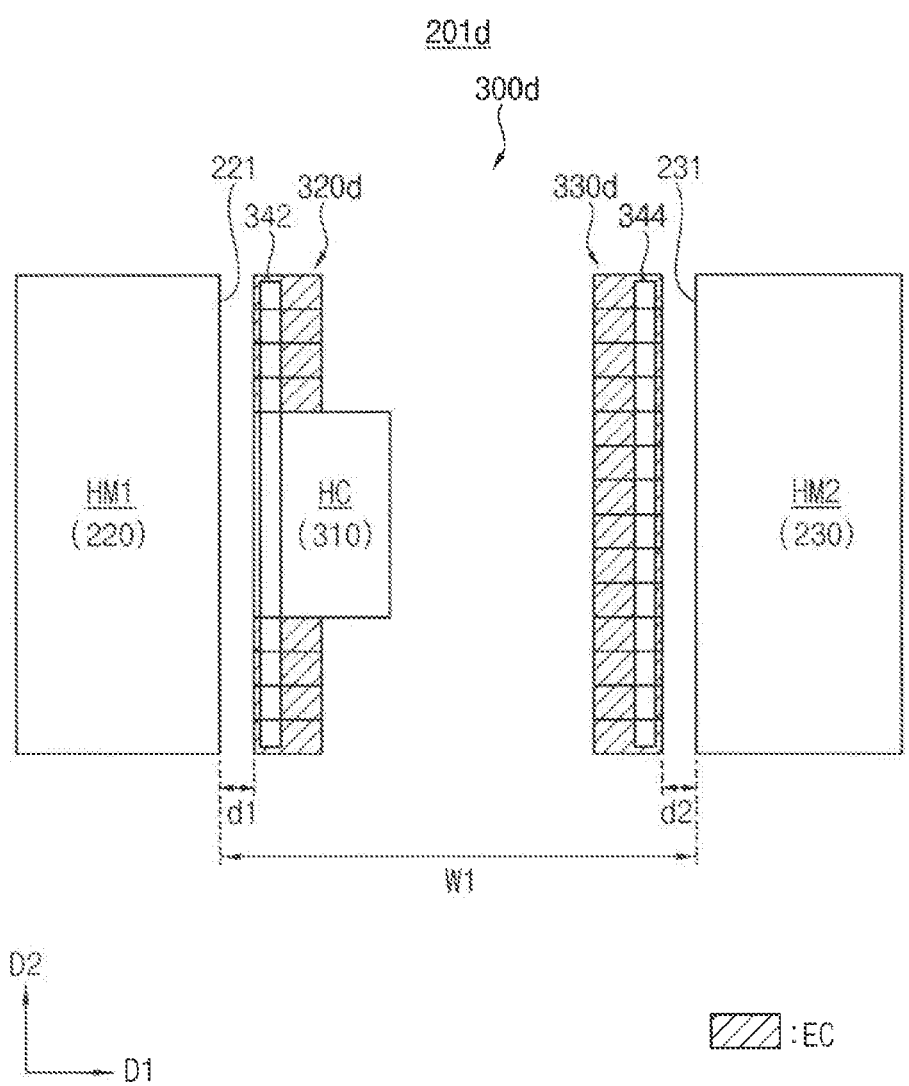
FIG. 10 illustrates another example of a portion of the semiconductor device of FIG. 4 according to an example embodiment.

FIG. 10 illustrates another example of a portion of the semiconductor device of FIG. 4 according to an example embodiment.

FIG. 10 illustrates a semiconductor device 201d that includes a standard cell area 300d disposed between the hard macros 220 and 230.

Referring to FIG. 10, the standard cell area 300d is defined between the first hard macro 220 and the second hard macro 230, and the second hard macro 230 is spaced apart from the first hard macro 220 by a first distance W1 in the first direction D1.

A plurality of first ending cells 320d, a plurality of second ending cells 330d and the head cell 310 are arranged in the standard cell area 300d. The first ending cells 320d may be spaced apart from the first hard macro 220 by a first gap d1 in the first direction D1, and may be arranged along the second direction D2. The second ending cells 330d may be spaced apart from the second hard macro 230 by a second gap d2 in the first direction D1, and may be arranged along the second direction D2. The head cell 310 may be disposed among the first ending cells 320d.

Compared with FIG. 8, a shielding pattern is not disposed in the first hard macro 220 and a shielding pattern is not disposed in the second hard macro 230. The standard cell area 300d may further include a second shielding pattern 342 and a fourth shielding pattern 344.

In an example embodiment, each of the first ending cells 320d may operate as one of an ending capacitor, a dummy cell and a well-tie, and each of the second ending cells 330d may operate as one of an ending capacitor, a dummy cell and a well-tie. Each of the first ending cells 320d and each of the second ending cells 330d may operate as one or more of an ending capacitor, a dummy cell and a well-tie.

Figure 11:
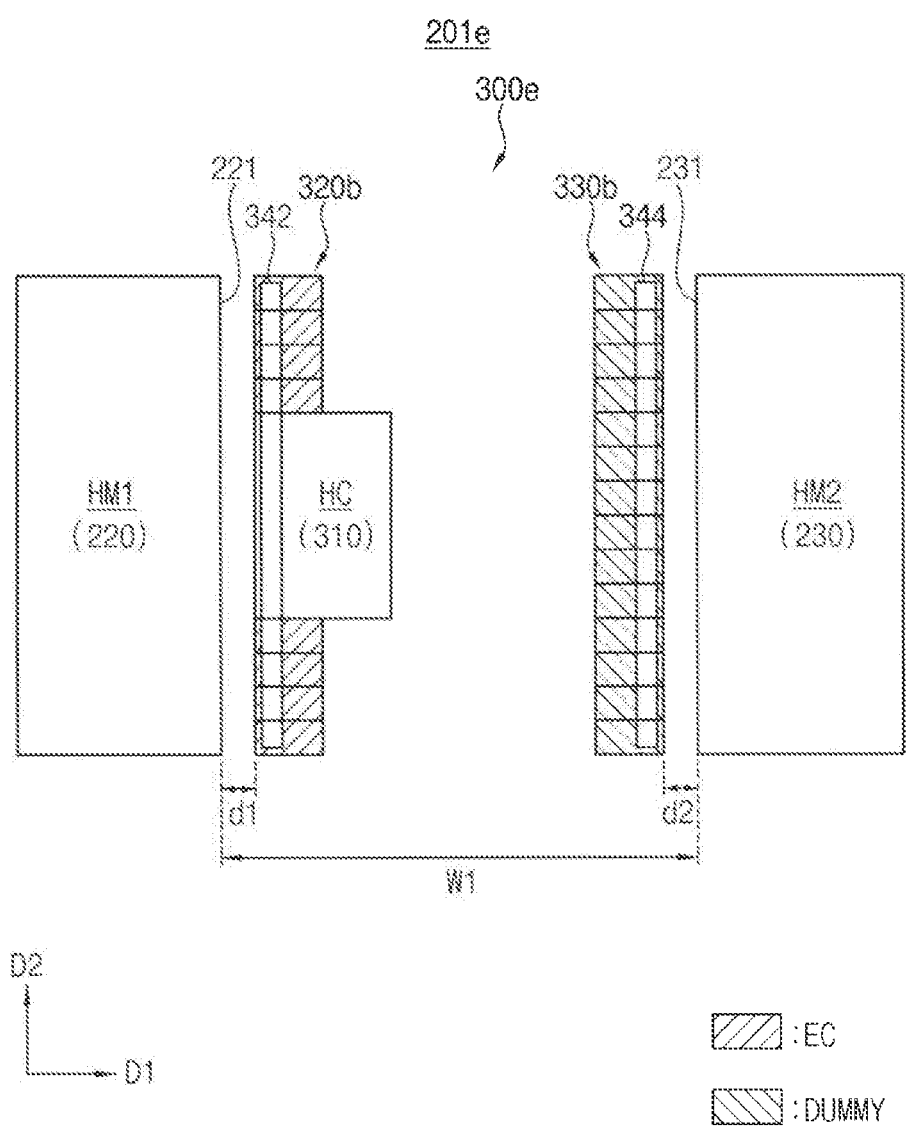
FIG. 11 illustrates another example of a portion of the semiconductor device of FIG. 4 according to an example embodiment.

FIG. 11 illustrates another example of a portion of the semiconductor device of FIG. 4 according to an example embodiment.

FIG. 11 illustrates a semiconductor device 201e that includes a standard cell area 300e disposed between the hard macros 220 and 230.

Referring to FIG. 11, the standard cell area 300e is defined between the first hard macro 220 and the second hard macro 230, and the second hard macro 230 is spaced apart from the first hard macro 220 by a first distance W1 in the first direction D1.

A plurality of first ending cells 320b, a plurality of second ending cells 330b and the head cell 310 are arranged in the standard cell area 300e. The first ending cells 320b may be spaced apart from the first hard macro 220 by a first gap d1 in the first direction D1, and may be arranged along the second direction D2. The second ending cells 330b may be spaced apart from the second hard macro 230 by a second gap d2 in the first direction D1, and may be arranged along the second direction D2. The head cell 310 may be disposed among the first ending cells 320b.

Compared with FIG. 8, a shielding pattern is not disposed in the first hard macro 220 and a shielding pattern is not disposed in the second hard macro 230. The standard cell area 300e may further include a second shielding pattern 342 and a fourth shielding pattern 344.

In an example embodiment, a shielding pattern may be disposed in each of the first hard macro 220 and the second hard macro 230 and the standard cell area 300e may not include shielding patterns. Therefore, a shielding pattern may not be repeated around the first edge 221 and a shielding pattern may not be repeated around the second edge 231.

As in FIG. 8, each of the second ending cells 330b may operate as a dummy cell, and each of the first ending cells 320b may operate as a well-tie or as the well-tie and one or more of an ending capacitor and a dummy cell.

Figure 12:
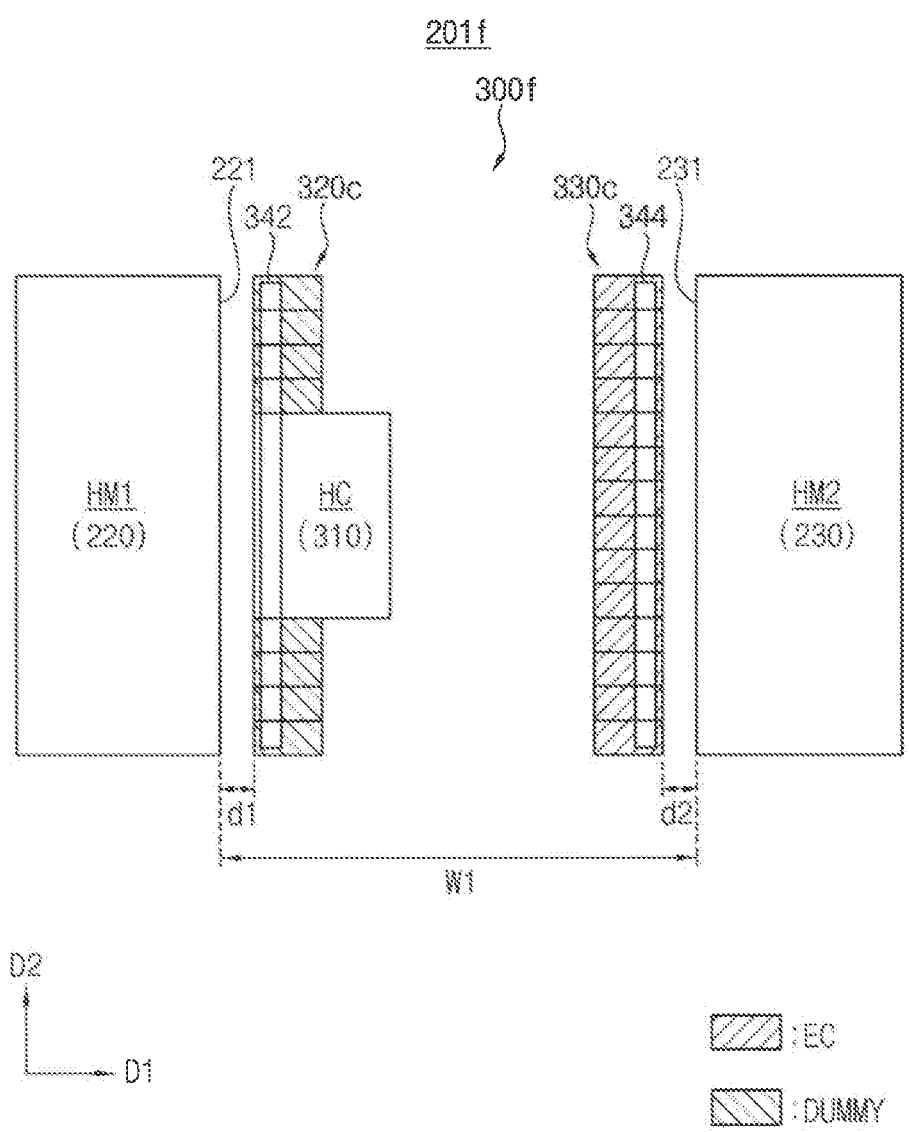
FIG. 12 illustrates another example of a portion of the semiconductor device of FIG. 4 according to an example embodiment.

FIG. 12 illustrates another example of a portion of the semiconductor device of FIG. 4 according to an example embodiment.

FIG. 12 illustrates a semiconductor device 201f that includes a standard cell area 300f disposed between the hard macros 220 and 230.

Referring to FIG. 12, the standard cell area 300f is defined between the first hard macro 220 and the second hard macro 230, and the second hard macro 230 is spaced apart from the first hard macro 220 by a first distance W1 in the first direction D1.

A plurality of first ending cells 320c, a plurality of second ending cells 330c and the head cell 310 are arranged in the standard cell area 300f. The first ending cells 320b may be spaced apart from the first hard macro 220 by a first gap d1 in the first direction D1, and may be arranged along the second direction D2. The second ending cells 330b may be spaced apart from the second hard macro 230 by a second gap d2 in the first direction D1, and may be arranged along the second direction D2. The head cell 310 may be disposed among the first ending cells 320b.

The first ending cells 320c may be spaced apart from the first hard macro 220 by a first gap d1 in the first direction D1, and may be arranged along the second direction D2. The second ending cells 330c may be spaced apart from the second hard macro 230 by a second gap d2 in the first direction D1, and may be arranged along the second direction D2. The head cell 310 may be disposed among the first ending cells 320c.

Compared with FIG. 9, a shielding pattern is not disposed in the first hard macro 220 and a shielding pattern is not disposed in the second hard macro 230. The standard cell area 300f may further include a second shielding pattern 342 and a fourth shielding pattern 344.

In an example embodiment, a shielding pattern may be disposed in each of the first hard macro 220 and the second hard macro 230 and the standard cell area 300e may not include shielding patterns. Therefore, a shielding pattern may not be repeated around the first edge 221 and a shielding pattern may not be repeated around the second edge 231.

As in FIG. 9, each of the first ending cells 320c may operate as a dummy cell, and each of the second ending cells 330c may operate as a well-tie or as the well-tie and one or more of an ending capacitor and a dummy cell.

Figure 13:
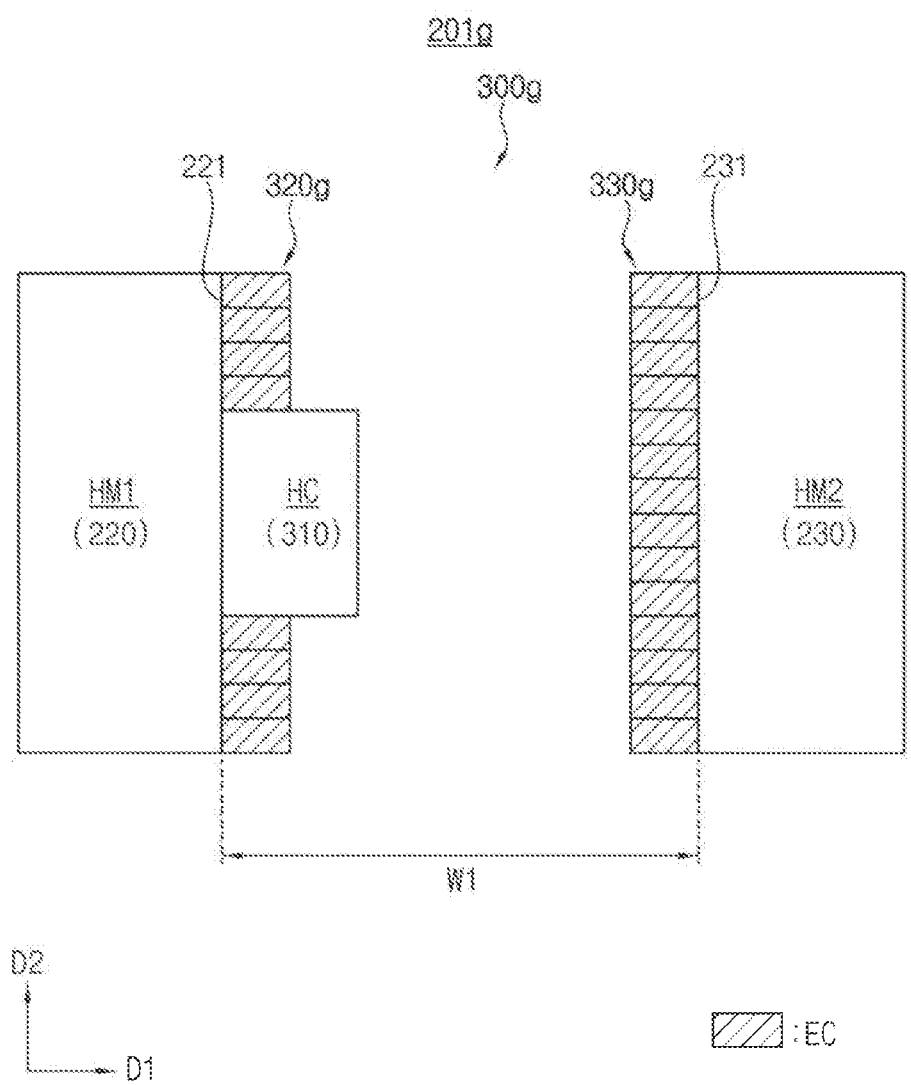
FIG. 13 illustrates another example of a portion of the semiconductor device of FIG. 4 according to an example embodiment.

FIG. 13 illustrates another example of a portion of the semiconductor device of FIG. 4 according to an example embodiment.

FIG. 13 illustrates a semiconductor device 201g that includes a standard cell area 300g disposed between the hard macros 220 and 230.

Referring to FIG. 13, the standard cell area 300g is defined between the first hard macro 220 and the second hard macro 230, and the second hard macro 230 is spaced apart from the first hard macro 220 by a first distance W1 in the first direction D1.

A plurality of first ending cells 320g, a plurality of second ending cells 330g and the head cell 310 are arranged in the standard cell area 300g. The first ending cells 320g may be directly adjacent the first hard macro 220 in the first direction D1, and may be arranged along the second direction D2. The second ending cells 330g may be may be directly adjacent second hard macro 230 in the first direction D1, and may be arranged along the second direction D2. The head cell 310 may be disposed among the first ending cells 320g.

As in FIG. 6, each of the first ending cells 320g may operate as one of an ending capacitor, a dummy cell and a well-tie, and each of the second ending cells 330g may operate as one of an ending capacitor, a dummy cell and a well-tie. When each of the first ending cells 320g and each of the second ending cells 330g operate as a dummy cell, each of the first ending cells 320g and each of the second ending cells 330g may further operate as a well-tie.

Figure 14:
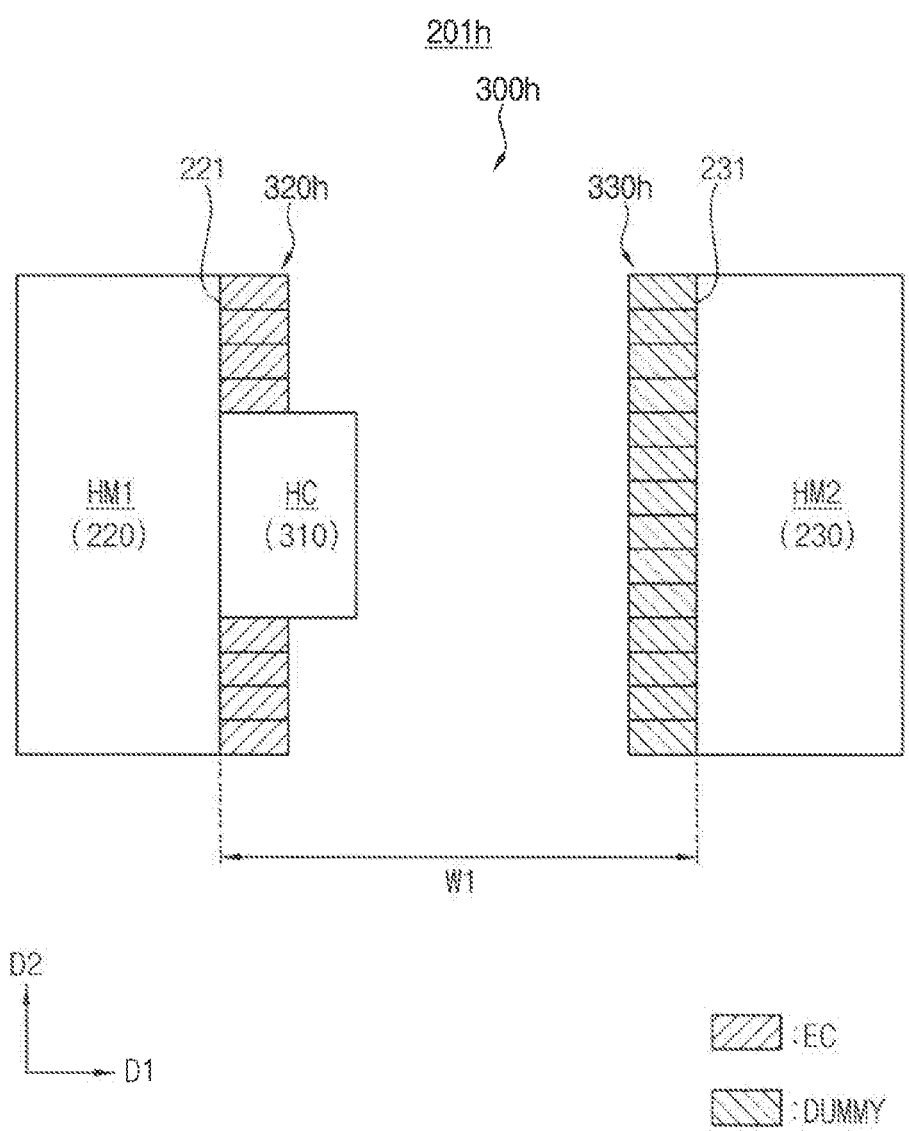
FIG. 14 illustrates another example of a portion of the semiconductor device of FIG. 4 according to an example embodiment.

FIG. 14 illustrates another example of a portion of the semiconductor device of FIG. 4 according to an example embodiment.

FIG. 14 illustrates a semiconductor device 201h that includes a standard cell area 300h disposed between the hard macros 220 and 230.

Referring to FIG. 14, the standard cell area 300h is defined between the first hard macro 220 and the second hard macro 230, and the second hard macro 230 is spaced apart from the first hard macro 220 by a first distance W1 in the first direction D1.

A plurality of first ending cells 320h, a plurality of second ending cells 330g and the head cell 310 are arranged in the standard cell area 300h. The first ending cells 320h may be directly adjacent the first hard macro 220 in the first direction D1, and may be arranged along the second direction D2. The second ending cells 330h may be may be directly adjacent second hard macro 230 in the first direction D1, and may be arranged along the second direction D2. The head cell 310 may be disposed among the first ending cells 320h.

As in FIG. 8, each of the second ending cells 330h may operate as a dummy cell, and each of the first ending cells 320h may operate as a well-tie or as the well-tie and one or more of an ending capacitor and a dummy cell.

Figure 15:
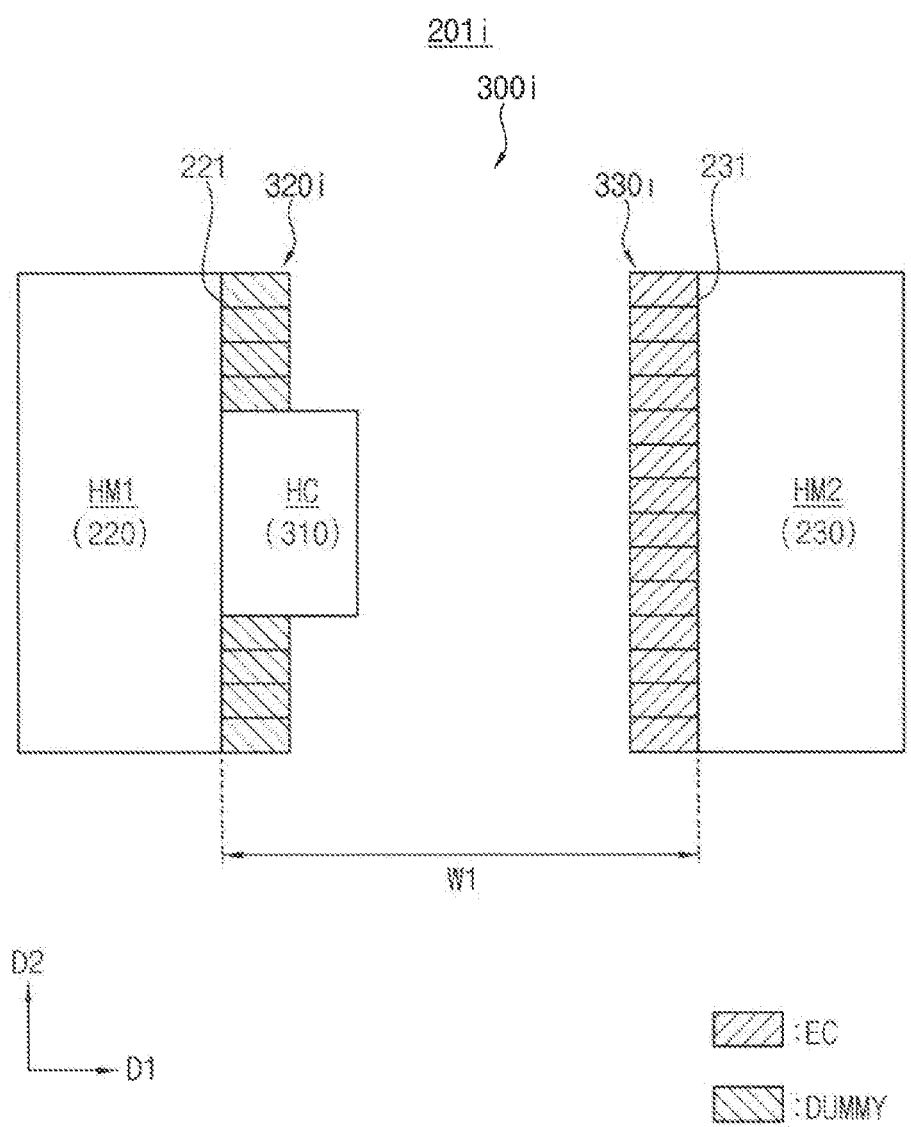
FIG. 15 illustrates another example of a portion of the semiconductor device of FIG. 4 according to an example embodiment.

FIG. 15 illustrates another example of a portion of the semiconductor device of FIG. 4 according to an example embodiment.

FIG. 15 illustrates a semiconductor device 201i that includes a standard cell area 300i disposed between the hard macros 220 and 230.

Referring to FIG. 15, the standard cell area 300i is defined between the first hard macro 220 and the second hard macro 230, and the second hard macro 230 is spaced apart from the first hard macro 220 by a first distance W1 in the first direction D1.

A plurality of first ending cells 320i, a plurality of second ending cells 330i and the head cell 310 are arranged in the standard cell area 300i. The first ending cells 320i may be directly adjacent the first hard macro 220 in the first direction D1, and may be arranged along the second direction D2. The second ending cells 330i may be may be directly adjacent second hard macro 230 in the first direction D1, and may be arranged along the second direction D2. The head cell 310 may be disposed among the first ending cells 320i.

As in FIG. 9, each of the first ending cells 320i may operate as a dummy cell, and each of the second ending cells 330i may operate as a well-tie or as the well-tie and one or more of an ending capacitor and a dummy cell.

Figure 16:
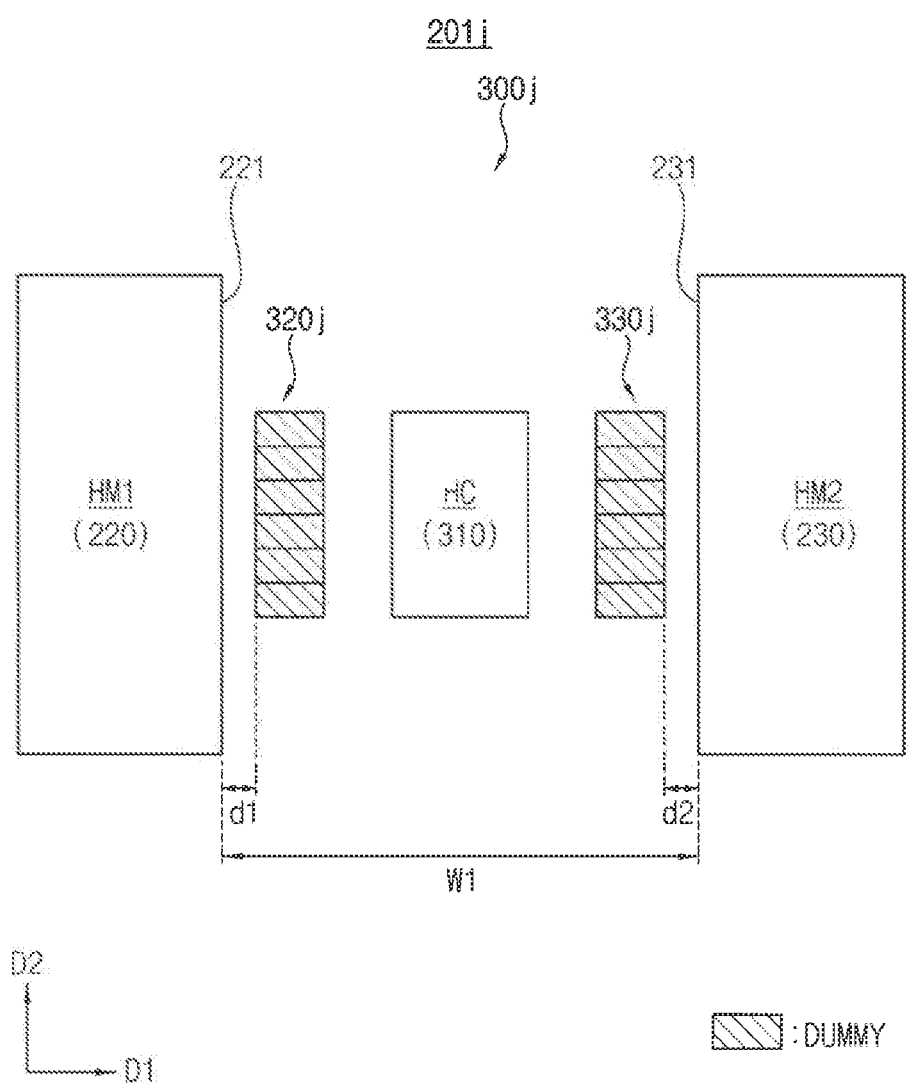
FIG. 16 illustrates another example of a portion of the semiconductor device of FIG. 4 according to an example embodiment.

FIG. 16 illustrates another example of a portion of the semiconductor device of FIG. 4 according to an example embodiment.

FIG. 16 illustrates a semiconductor device 201j that includes a standard cell area 300j disposed between the hard macros 220 and 230.

Referring to FIG. 16, the standard cell area 300j is defined between the first hard macro 220 and the second hard macro 230, and the second hard macro 230 is spaced apart from the first hard macro 220 by a first distance W1 in the first direction D1.

A plurality of first ending cells 320j, a plurality of second ending cells 330j and a head cell 310 are arranged in the standard cell area 300j. The first ending cells 320j may be spaced apart from a first edge 221 of the first hard macro 220 by a first gap d1 in the first direction D1, and may be arranged along the second direction D2. The second ending cells 330j may be spaced apart from a second edge 231 of the second hard macro 230 by a second gap d2 in the first direction D1, and may be arranged along the second direction D2. The head cell 310 may be disposed in a center portion between the first ending cells 320j and the second ending cells 330j.

In the semiconductor device 201j of FIG. 16, a first number of the first ending cells 320j may be the same as a second number of the second ending cells 330j. Each of the first ending cells 320j and each of the second ending cells 330j may operate as a dummy cell.

Figure 17:
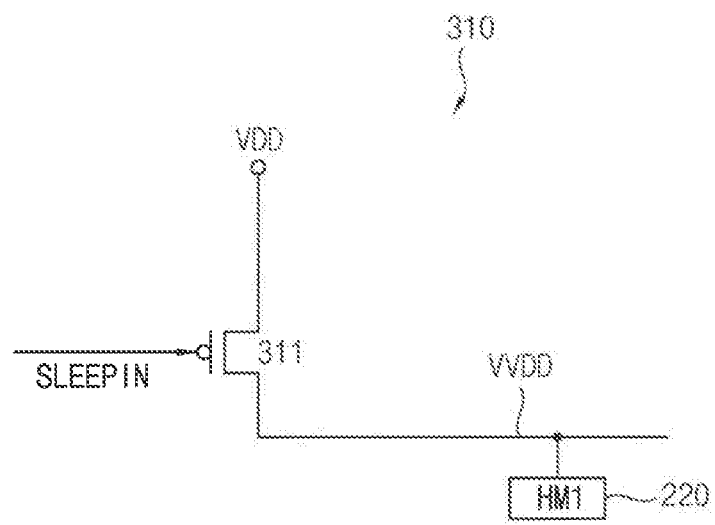
FIG. 17 illustrates an example of the head cell in the semiconductor device of FIG. 6 according to an example embodiment.

FIG. 17 illustrates an example of the head cell in the semiconductor device of FIG. 6 according to an example embodiment.

Referring to FIG. 17, the head cell 310 may perform power gating of a power supply voltage VDD suppled to the first hard macro 220 and may include a p-channel metal-oxide semiconductor (PMOS) transistor 311.

The PMOS transistor 311 may include a first electrode coupled to the power supply voltage VDD, a gate receiving a control signal SLEEPIN and a second electrode coupled to a virtual power line VVDD coupled to the first hard macro 220.

The PMOS transistor 311 may selectively connect the power supply voltage VDD to the virtual power line VVDD in response to the control signal SLEEPIN such that a power is selectively provided to the first hard macro 220. Therefore, the PMOS transistor 311 may operate as a power cut-off switch. Although FIG. 17 illustrate one power cut-off switch, i.e., the PMOS transistor 311, is disposed between the power supply voltage VDD and the virtual power line VVDD, a plurality of power cut-off switches may be disposed between the power supply voltage VDD and the virtual power line VVDD.

In an example embodiment, a body of the PMOS transistor 311 may be coupled to the power supply voltage VDD.

Figure 18:
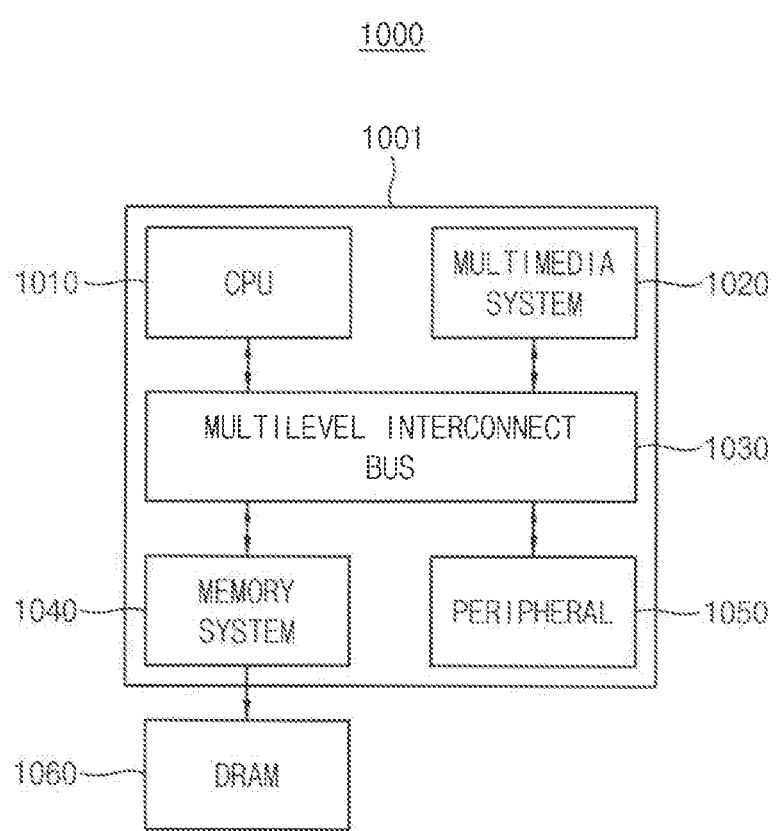
FIG. 18 is a block diagram illustrating a system-on-chip (SoC) system including semiconductor devices according to example embodiments.
Figure 19:
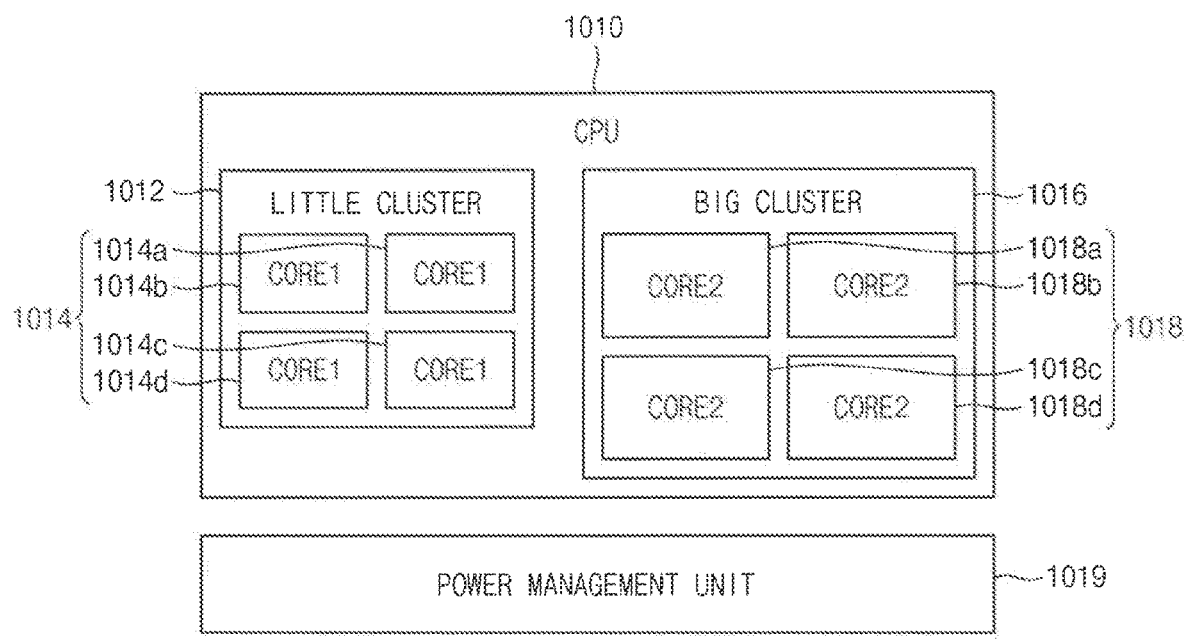
FIG. 19 is a block diagram of a central processing unit (CPU) in FIG. 18.
Figure 20:
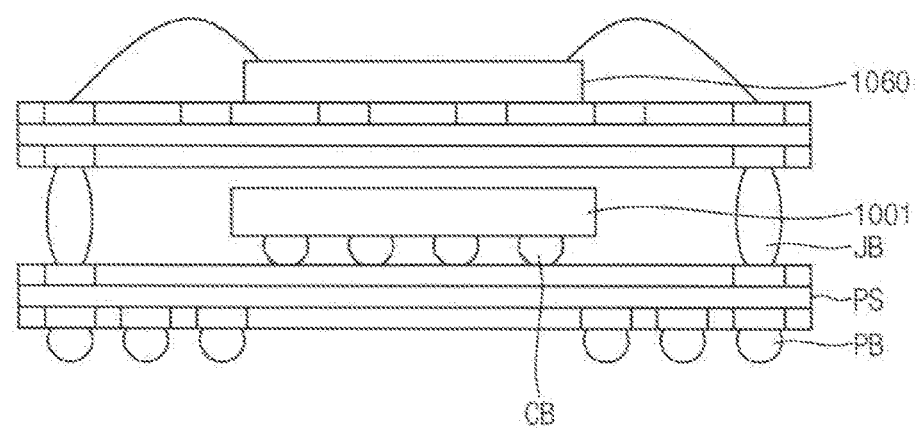
FIG. 20 illustrates the SoC of FIG. 18 after being packaged.

FIG. 18 is a block diagram illustrating a system-on-chip (SoC) system including semiconductor devices according to example embodiments. FIG. 19 is a block diagram of a CPU in FIG. 18. FIG. 20 illustrates the SoC of FIG. 18 after being packaged.

Referring to FIG. 18, an SoC system 1000 includes an application processor 1001 and a dynamic random access memory (DRAM) 1060.

The application processor 1001 may include the CPU 1010, a multimedia system 1020, a bus 1030, a memory system 1040, and a peripheral circuit 1050.

The CPU 1010 may perform operations needed to drive the SoC system 1000. In some example embodiments, the CPU 1010 may be configured as a multi-core processor including a plurality of cores.

In some example embodiments, the CPU 1010 may include a first cluster 1012 and a second cluster 1016 as illustrated in FIG. 19.

The first cluster 1012 may be placed in the CPU 1010 and include n (where n is a natural number) first cores 1014. In FIG. 19, for ease of description, a case where the first cluster 1012 includes four (i.e., n=4) first cores 1014a through 1014d will be described as an example. However, example embodiments are not limited to this case.

The second cluster 1016 may also be placed in the CPU 1010 and include n second cores 1018. The second cluster 1016 may be separated from the first cluster 1012. For ease of description, a case where the second cluster 1016 includes four (i.e., n=4) second cores 1018a through 1018d will be described as an example. However, example embodiments are not limited to this case.

In FIG. 19, the number of the first cores 1014 included in the first cluster 1012 is equal to the number of the second cores 1018 included in the second cluster 1016. However, example embodiments are not limited thereto. In some example embodiments, the number of the first cores 1014 included in the first cluster 1012 may also be different from the number of the second cores 1018 included in the second cluster 1016.

The example embodiments may be employed in an electronic device including a near-field communication (NFC) device. For example, the example embodiments may be applicable to a mobile phone, a smart phone, a personal digital assistant (PDA), a portable multimedia player (PMP), a digital camera, a music player, a portable game console, a navigation system or a laptop computer.

In addition, in FIG. 19, only the first cluster 1012 and the second cluster 1016 are placed in the CPU 1010. However, example embodiments are not limited thereto. When necessary, a third cluster which is separate from the first and second clusters 1012 and 1016 and includes third cores may additionally be placed in the CPU 1010.

In the example embodiment, the amount of computation per unit time of the first cores 1014 included in the first cluster 1012 may be different from the amount of computation per unit time of the second cores 1018 included in the second cluster 1016.

In some example embodiments, the first cluster 1012 may be a little cluster, and the second cluster 1016 may be a big cluster. In this case, the amount of computation per unit time of the first cores 1014 included in the first cluster 1012 may be smaller than the amount of computer per unit time of the second cores 1018 included in the second cluster 1016.

Therefore, the amount of computation per unit time in a case where all first cores 1014 included in the first cluster 1012 are enabled to perform an operation may be smaller than the amount of computation per unit time in a case where all second cores 1018 included in the second cluster 1016 are enabled to perform an operation.

The respective amounts of computation per unit time of the first cores 1014a through 1014d included in the first cluster 1012 may be equal, and the respective amounts of computation per unit time of the second cores 1018a through 1018d included in the second cluster 1016 may be equal. That is, assuming that the amount of computation per unit time of each of the first cores 1014a through 1014d is 10, the amount of computation per unit time of each of the second cores 1018a through 1018d may be 40.

A power management unit 1019 may enable or disable the first cluster 1012 and the second cluster 1016 as necessary. Specifically, when an operation needs to be performed by the first cluster 1012, the power management unit 1019 may enable the first cluster 1012 and disable the second cluster 1016. On the contrary, when an operation needs to be performed by the second cluster 1016, the power management unit 1019 may enable the second cluster 1016 and disable the first cluster 1012. When the amount of computation required can be fully processed by the first core 1014a, the power management unit 1019 may enable the first cluster 1012 and disable the second cluster 1016. Even within the first cluster 1012, the power management unit 1019 may enable the first core 1014a and disable the first cores 1014b through 1014d. In other words, the power management unit 1019 may determine whether to enable the first cluster 1012 and the second cluster 1016 and may also determine whether to enable each of the first cores 1014a through 1014d included in the first cluster 1012 and each of the second cores 1018a through 1018d included in the second cluster 1016.

In some example embodiments, the power management unit 1019 may enable the first and second clusters 1012 and 1016, and/or the cores 1014a through 1014d and 1018a through 1018d included in the first and second clusters 1012 and 1016 by supplying power to the first and second clusters 1012 and 1016, and/or the cores 1014a through 1014d and 1018a through 1018d included in the first and second clusters 1012 and 1016. In addition, the power management unit 1019 may disable the first and second clusters 1012 and 1016, and/or the cores 1014a through 1014d and 1018a through 1018d included in the first and second clusters 1012 and 1016 by cutting the power supply to the first and second clusters 1012 and 1016, and/or the cores 1014a through 1014*d* and 1018*a* through 1018*d* included in the first and second clusters 1012 and 1016.

The power management unit 1019 may enable only a specific cluster 1012 or 1016 and/or the cores 1014*a* through 1014*d* or 1018*a* through 1018*d* included in the specific cluster 1012 or 1016 according to the operating environment of the SoC system 1000, thereby managing the power consumption of the entire SoC system 100.

Referring back to FIG. 18, the multimedia system 1020 may be used to perform various multimedia functions in the SoC system 1000. The multimedia system 1020 may include a 3D engine module, a video codec, a display system, a camera system, a post-processor, etc.

The bus 1030 may be used for data communication among the CPU 1010, the multimedia system 1020, the memory system 1040 and the peripheral circuit 1050. In some example embodiments, the bus 1030 may have a multilayer structure. Specifically, the bus 1030 may be, but is not limited to, a multilayer advanced high-performance bus (AHB) or a multilayer advanced extensible interface (AXI).

The memory system 1040 may provide an environment needed for the application processor 1001 to be connected to an external memory (e.g., the DRAM 1060) and operate at high speed. In some example embodiments, the memory system 1040 may include a controller (e.g., a DRAM controller) needed to control the external memory (e.g., the DRAM 1060).

The peripheral circuit 1050 may provide an environment needed for the SoC system 1000 to smoothly connect to an external device (e.g., mainboard). Accordingly, the peripheral circuit 1050 may include various interfaces that enable the external device connected to the SoC system 1000 to be compatible with the SoC system 1000.

The DRAM 1060 may function as an operating memory needed for the operation of the application processor 1001. In some example embodiments, the DRAM 1060 may be placed outside the application processor 1001. Specifically, the DRAM 1060 may be packaged with the application processor 1001 in the form of package on package (PoP) as shown in FIG. 20.

Referring to FIG. 20, the semiconductor package may include a package substrate PS, the DRAM 1060, and the application processor 1001.

The package substrate PS may include a plurality of package balls PB. The package balls PB may be electrically connected to chip balls CB of the application processor 1001 by signal lines within the package substrate PS and may be electrically connected to joint balls JB by signal lines within the package substrate PS.

The DRAM 1060 may be electrically connected to the joint balls JB by wire bonding.

The application processor 1001 may be disposed under the DRAM 1060. The chip balls CB of the application processor 1001 may be electrically connected to the DRAM 1060 by the joint balls JB.

In FIG. 18, the DRAM 1060 is placed outside the application processor 1001. However, example embodiments are not limited thereto. When necessary, the DRAM 1060 may also be placed inside the application processor 1001.

The semiconductor device 200 may be provided as any one of the elements of the SoC system 1000.

Various example embodiments may be applied to semiconductor devices and systems including the semiconductor devices.

The foregoing is illustrative of example embodiments and is not to be construed as limiting thereof. Although a few example embodiments have been described, those skilled in the art will readily appreciate that many modifications are possible without materially departing from the novel teachings and advantages of the present disclosure. Accordingly, all such modifications are intended to be included within the scope of the present disclosure as defined in the claims.

What is claimed is:

1. A method of designing a layout of a semiconductor device comprising:
   receiving information indicating a size of a target chip;
   allocating a first hard macro area, a second hard macro area and an input/output area;
   arranging a head cell, a plurality of first ending cells and a plurality of second ending cells in a standard cell area between the first hard macro area and the second hard macro area such that the head cell is not overlapped with the plurality of first ending cells and the plurality of second ending cells;
   providing a substrate having an upper surface that extends in a first direction and a second direction that crosses the first direction;
   providing a signal connection layer on the upper surface;
   providing a power mesh layer on the signal connection layer; and
   providing a via on the head cell and extending in a third direction through the signal connection layer to the power mesh layer, wherein the third direction is perpendicular to the upper surface and a power supply voltage applied to the first hard macro area by the head cell is provided from the power mesh layer through the via,
   wherein the head cell is configured to perform power gating of the power supply voltage provided to at least one of the first hard macro area and the second hard macro area, and
   wherein the second hard macro area is spaced apart from the first hard macro area in the first direction by a first distance.

2. The method of designing the layout of the semiconductor device of claim 1, wherein the arranging the head cell, the plurality of first ending cells and the plurality of second ending cells comprises:
   arranging the plurality of first ending cells adjacent the first hard macro area;
   arranging the plurality of second ending cells adjacent the second hard macro area; and
   arranging the head cell among the plurality of first ending cells such that the head cell is adjacent the first hard macro area.

3. The method of designing the layout of the semiconductor device of claim 2, wherein the arranging the head cell, the plurality of first ending cells and the plurality of second ending cells comprises:
   arranging the plurality of first ending cells along the second direction such that the plurality of first ending cells are spaced apart from the first hard macro area in the first direction by a second distance;
   arranging the plurality of second ending cells along the second direction such that the plurality of second ending cells are spaced apart from the second hard macro area in the first direction by a third distance; and
   arranging the head cell among the plurality of first ending cells.

4. The method of designing the layout of the semiconductor device of claim 1, wherein each of the plurality of second ending cells is configured to operate as a dummy cell and each of the plurality of first ending cells is configured to operate as a well-tie or the well-tie and one or more of an ending capacitor and a dummy cell.

5. The method of designing the layout of the semiconductor device of claim 1,
wherein the head cell does not overlap the plurality of first ending cells and the plurality of second ending cells, and
wherein the head cell is interposed among the plurality of first ending cells adjacent the first hard macro area.

6. The method of designing the layout of the semiconductor device of claim 1, further comprising:
arranging a first shielding pattern adjacent to a first edge of the first hard macro area, the first shielding pattern being arranged in the second direction, the first edge of the first hard macro area being adjacent the plurality of first ending cells; and
arranging a second shielding pattern adjacent to a second edge of the second hard macro area, the second shielding pattern being arranged in the second direction, the second edge of the second hard macro area being adjacent the plurality of second ending cells.

7. The method of designing the layout of the semiconductor device of claim 6, wherein the first shielding pattern is disposed within the first hard macro area or is disposed to cross the plurality of first ending cells and the head cell.

8. The method of designing the layout of the semiconductor device of claim 6, wherein the second shielding pattern is disposed within the second hard macro area or is disposed to cross the plurality of second ending cells.

9. The method of designing the layout of the semiconductor device of claim 6, wherein the first shielding pattern is disposed within the first hard macro area and the second shielding pattern is disposed within the second hard macro area.

10. The method of designing the layout of the semiconductor device of claim 9, further comprising:
arranging a third shielding pattern disposed to cross the plurality of first ending cells and the head cell, the third shielding pattern extending in the second direction; and
arranging a fourth shielding pattern disposed to cross the plurality of second ending cells and the head cell, the third shielding pattern extending in the second direction.

11. The method of designing the layout of the semiconductor device of claim 1, wherein each of the plurality of first ending cells and the head cell are directly adjacent the first hard macro area along the first direction, and
wherein each of the plurality of second ending cells is directly adjacent the second hard macro area along the first direction.

12. The method of designing the layout of the semiconductor device of claim 1, wherein each of the plurality of first ending cells is spaced apart from the first hard macro area in the first direction by a first gap and disposed along the second direction, and
wherein each of the plurality of second ending cells is spaced apart from the second hard macro area in the first direction by a second gap and disposed along the second direction.

13. The method of designing the layout of the semiconductor device of claim 12, wherein each of the plurality of first ending cells and each of the plurality of second ending cells are configured to operate as a dummy cell.

14. The method of designing the layout of the semiconductor device of claim 1, wherein the plurality of first ending cells adjacent the first hard macro area and the head cell are disposed along the second direction.

15. The method of designing the layout of the semiconductor device of claim 1, wherein the head cell comprises a transistor configured to electrically connect the power supply voltage to the first hard macro area based on a control signal being a low signal, and electrically isolate the power supply voltage from the first hard macro area based on the control signal being a high signal.

16. A method of fabricating a semiconductor device, the method of fabricating comprising:
designing a layout of a target chip in a layout design system;
performing an optical proximity correction (an OPC) on the layout in a simulation tool in the layout design system to determine a layout change;
manufacturing photomasks based on the layout change; and
manufacturing the semiconductor device using the photomasks, wherein the designing the layout of the target chip includes:
receiving information indicating a size of the target chip through the layout design system;
allocating a first hard macro area, a second hard macro area and an input/output area;
arranging a head cell, a plurality of first ending cells and a plurality of second ending cells in a standard cell area between the first hard macro area and the second hard macro area such that the head cell is not overlapped with the plurality of first ending cells and the plurality of second ending cells,
providing a substrate having an upper surface that extends in a first direction and a second direction that crosses the first direction;
providing a signal connection layer on the upper surface;
providing a power mesh layer on the signal connection layer; and
providing a via on the head cell and extending in a third direction through the signal connection layer to the power mesh layer, wherein the third direction is perpendicular to the upper surface and a power supply voltage applied to the first hard macro area by the head cell is provided from the power mesh layer through the via,
wherein the head cell is configured to perform power gating of the power supply voltage provided to at least one of the first hard macro area and the second hard macro area, and
wherein the second hard macro area is spaced apart from the first hard macro area in the first direction by a first distance.

17. The method of claim 16, wherein the plurality of first ending cells adjacent the first hard macro area and the head cell are disposed along the second direction.

18. The method of claim 16, wherein the head cell comprises a transistor configured to electrically connect the power supply voltage to the first hard macro area based on a control signal being a low signal, and electrically isolate the power supply voltage from the first hard macro area based on the control signal being a high signal.

19. The method of claim 16, wherein the head cell is spaced apart from the plurality of second ending cells in the first direction by a second distance and the plurality of first ending cells are spaced apart from the plurality of second ending cells in the first direction by a third distance that is greater than the second distance.

20. The method of claim 16,
wherein the head cell does not overlap the plurality of first ending cells and the plurality of second ending cells, and
wherein the head cell is interposed among the plurality of first ending cells adjacent the first hard macro area.

* * * * *